Dec. 7, 1948.    S. H. STONE    2,455,623
COMBINATION SERVING, STRAINING, AND CARVING IMPLEMENT
Filed May 6, 1947
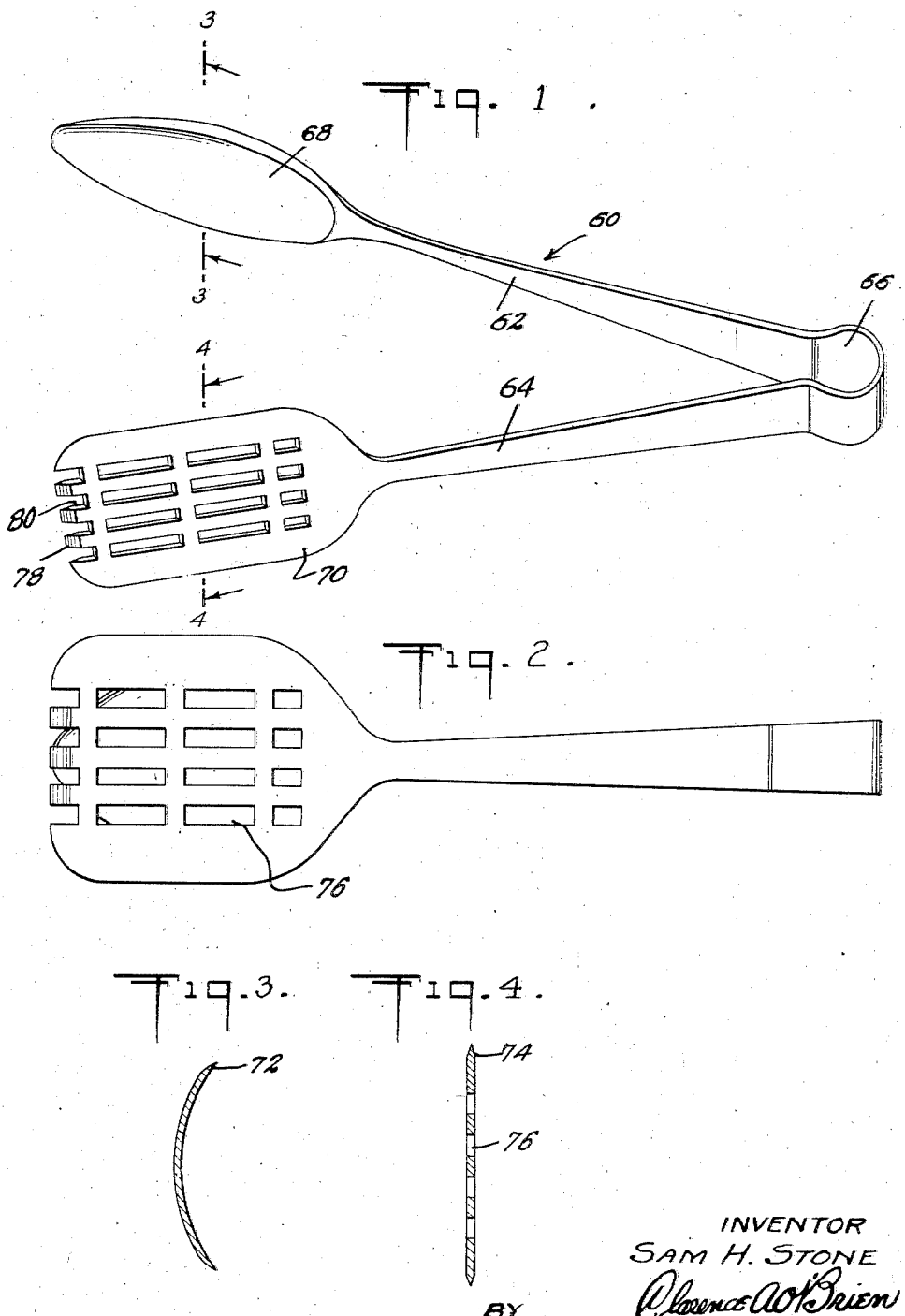
INVENTOR
SAM H. STONE
BY
Clarence A. O'Brien
and Harvey B. Jacobson
ATTORNEY Patented Dec. 7, 1948

2,455,623

UNITED STATES PATENT OFFICE 2,455,623

COMBINATION SERVING, STRAINING, AND CARVING IMPLEMENT

Sam H. Stone, New York, N. Y.

Application May 6, 1947, Serial No. 746,225

3 Claims. (Cl. 30—123)

This invention comprises novel and useful improvements in a combination serving, straining and carving implement and more specifically pertains to a culinary utensil having particular utility for cafeterias, restaurants or the like.

The principal object of this invention resides in providing a unitary culinary article which is ideally adapted to serve a variety of purposes in handling and dispensing food in restaurants and the like.

An important object of the invention consists in providing a kitchen utensil which may readily be manipulated by one hand, for securing, handling and dispensing servings of food or the like.

Another important purpose of the invention resides in devising a serving implement which may be utilized as a carver for severing portions of food.

A further intention of the invention is to construct a culinary article which possesses the advantages, functions and qualifications of a spoon, a knife and a fork.

A still further aim of the invention is to produce a device which is capable of carving or severing foods with any of its edges, securely gripping, retaining and dispensing servings of food gripped by its blades, and which may be simultaneously utilized as a strainer for eliminating surplus moisture from the servings of food, as desired.

And a final object of the invention to be specifically enumerated herein, contemplates the provision of a culinary implement which shall be simple, integral and inexpensive construction, particularly adapted for manipulation by one hand of the user, and which is capable of all of the necessary uses and functions requisite to serving portions of food in a restaurant or cafeteria.

These, together with various ancillary objects of the invention which will later become apparent as the following description proceeds, are attained by this device, preferred embodiments of which have been illustrated, by way of example only, in the attached drawings, wherein:

Figure 1 is a perspective view of the invention;

Figure 2 is a side elevational view of Figure 1; and

Figures 3 and 4 are transverse sectional views taken substantially upon the section lines 3—3 and 4—4 of Figure 1.

Referring now more specifically to the attached drawings, wherein like numerals designate similar parts throughout the various views, attention is directed to the embodiment of Figures 1–4 wherein numeral 60 identifies the complete combination article. As shown, a pair of shanks 62 and 64 are connected at one of their extremities by an integral, resilient semi-circular extension 66 while their opposite extremities are enlarged to provide food handling portions 68 and 70. These enlarged portions are provided with beveled knife-shaped edges 72 and 74. Preferably, the member 68 is shaped to provide a spoon, while the member 70 is shaped as a generally rectangular, flat plate, proportioned to laterally and longitudinally overlie the perimeter of the spoon. The portion 70 is provided with a plurality of longitudinally extending, parallel rows of apertures 76 in the form of square and/or elongated slots, while the outer end of the portion is preferably beveled as at 78 and notched as at 80 to assist in holding, scooping up, scraping or severing food.

It should be noted that the portion 70 possesses considerably greater area than that of the spoon 68, while the chisel-shaped or knife-shaped edges 78 give an additional utility.

It should be here noted that the embodiment of the invention provides a combination culinary utensil by means of which the chef or server of a restaurant or cafeteria may with one hand carve, separate, grip and dispense selected portions of food, and may strain or compress the same without releasing the article or its engagement upon the helping of food. This greatly facilitates the loading of plates or trays, and minimizes the work required for these purposes in restaurants or like places.

Since numerous modifications of this invention will readily occur to those skilled in the art after a consideration of the foregoing specification and annexed drawings, it is not intended to limit the invention to the exact construction as shown and described, but all suitable modifications may be resorted to following the scope of the appended claims.

Having described the invention, what is claimed as new is:

1. A combination serving implement consisting of a pair of shanks integrally and resiliently secured together, said securing means biasing them apart, said shanks terminating in a spoon portion and a combined strainer and fork portion, the tines of the fork being beveled to a knife edge to provide a spearing and cutting edge, transverse means separating the fork from the strainer, each portion including knife edges to provide cutting means and said spoon and combined strainer and fork portion being of equal length.

2. The combination of claim 1, wherein said knife, fork and strainer portion include elongated slots.

3. The combination of claim 2, wherein said slots are parallel and are longitudinally disposed.

SAM H. STONE.

REFERENCES CITED

The following references are of record in the file of this patent:

UNITED STATES PATENTS

| Number | Name | Date |
|---|---|---|
| D. 76,013 | Gordon | Aug. 14, 1928 |
| 904,553 | McCoy | Nov. 24, 1908 |
| 1,643,456 | James | Sept. 27, 1927 |
| 2,110,074 | Fuerst | Aug. 6, 1935 |